Feb. 14, 1933.  A. CARTER  1,897,462
RETARDING OR PRESSURE CONTROLLING DEVICE
Filed May 21, 1931  5 Sheets-Sheet 2

Inventor
ARTHUR CARTER
By Richards & Geier
Attorneys

Feb. 14, 1933.  A. CARTER  1,897,462
RETARDING OR PRESSURE CONTROLLING DEVICE
Filed May 21, 1931  5 Sheets-Sheet 3

Fig.6.

Inventor
ARTHUR CARTER
By Richards & Geier
Attorneys

Feb. 14, 1933.  A. CARTER  1,897,462
RETARDING OR PRESSURE CONTROLLING DEVICE
Filed May 21, 1931   5 Sheets-Sheet 4

Inventor
ARTHUR CARTER
By Richards & Geier
Attorneys

Patented Feb. 14, 1933

1,897,462

UNITED STATES PATENT OFFICE

ARTHUR CARTER, OF BIRMINGHAM, ENGLAND, ASSIGNOR OF ONE-HALF TO JOHN LEES, OF BIRMINGHAM, ENGLAND

RETARDING OR PRESSURE CONTROLLING DEVICE

Application filed May 21, 1931, Serial No. 539,000, and in Great Britain May 30, 1930.

This invention relates to retarding or pressure-controlling devices of the kind in which a fluid is acted upon by a plunger for controlling the pressure or relieving the shock due to an applied force, the invention being particularly applicable to presses for the drawing or cupping of sheet-metal articles from blanks, for the purpose of giving a controlled resisting pressure to the downward movement of the draw ring; although the invention is also applicable generally for the purpose of offering a controlled resistance to a moving part, such as in the case of shock-absorbers for vehicles, gun resistance buffers, aeroplane landing devices and the like.

The principal object of the present invention is to provide an improved controlled resistance or retarding device having improved and more efficient means for creating and controlling the resistance offered to the applied force, such that, if desired, a progressively diminishing resistance (for example, when applied to a drawing press), or a constant or increasing resistance, may be obtained. A further object of the invention is to provide for the regulated return to the cylinders of any fluid that may have escaped past the plungers employed in the apparatus.

Referring to the form of the invention shown in Figures 1 to 5 of the drawings, which represent a resistance device for controlling the downward movement of the pressure or draw ring of a press, the pins depending from the said draw ring rest upon a plate 1 attached to the upper end of a pair or more of vertical rods or shanks 2, 2, slidably passing through the top cover-plate 3 of a stationary main cylinder 4 and connected to a vertically-moving main plunger 5 contained therein. This cylinder is closed at its lower end by a bottom plate 6 having a central circular aperture, and is carried at its said lower end by the cover-plate 7 of another or secondary cylinder 8 of considerably larger diameter than the main cylinder and containing a vertically-moving plunger 9. The cylinders 4, 8, may be fixed to the frame of the press by a central pillar 10 on the cover plate 3, the same being attached to the bolster of the press. Or the plunger 5 could be operated by a single central rod attached to the plunger and moving through plate 1, the cylinder 8 being bolted to the underside of the press bed. The plunger 9 in the lower or secondary cylinder 8 carries a central depending tubular shank 11 which slides through an opening in the bottom cover-plate 12 of the said cylinder, and the lower shouldered end of this shank engages an opening in a plate 13 supported upon the upper end of a coiled compression spring 14 contained within a casing 15 attached to the cylinder 8. The lower end of the said spring rests upon a closure 16 adjustably screwed into the bottom end of the casing 15, and screwed through the centre of this closure 16 is an adjustable leg 17 whose lower end can be adjusted to rest upon the floor and take the weight of the apparatus and the thrust strain of the descending draw ring from off the bolster of the press. The spring 14 resists downward movement of the secondary plunger 9 and tends to return the same to the upper end of the cylinder 8. Oil or other suitable fluid is introduced into the main cylinder 4 so as to fill the same (the plunger 5 being at the top of its stroke) and also so as to fill the space above the secondary plunger 9 when the latter is raised. When the secondary plunger is thus raised the top corner 18 thereof engages a conical seating 19 on the bottom of the main cylinder so that the spring 14 maintains a tight joint and prevents access of the fluid above the plunger to the rings and periphery of the said plunger, so that leakage of fluid past the plunger when the press is standing idle is prevented.

Figure 1:
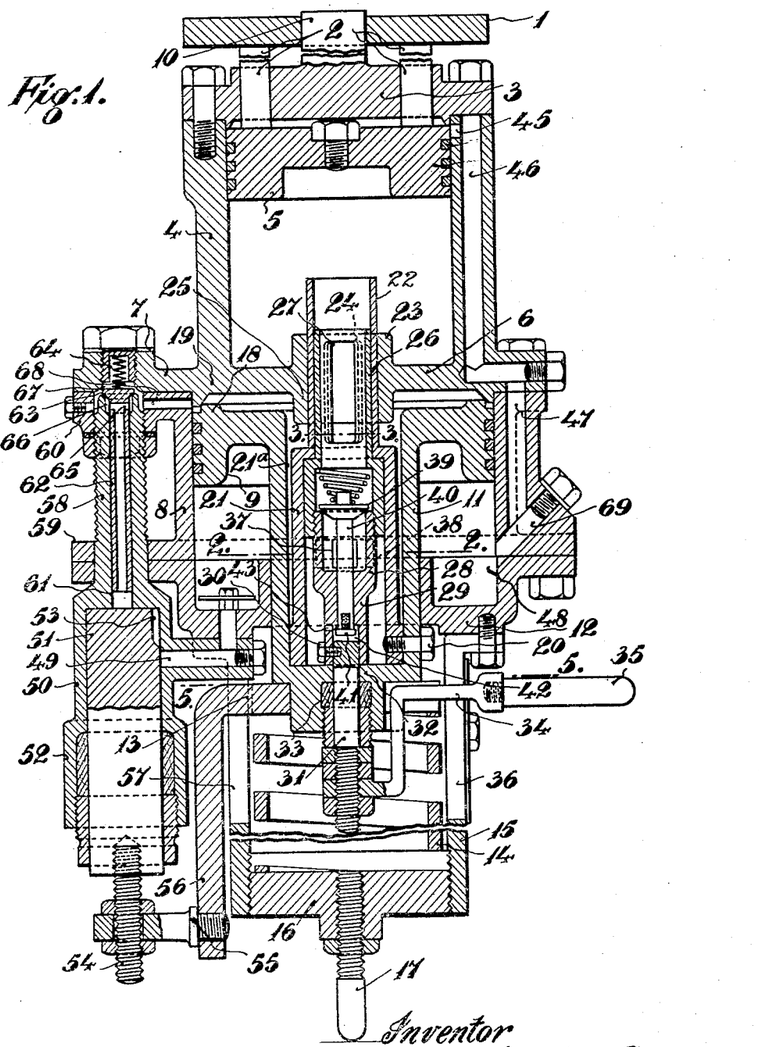
Figure 1 of the accompanying drawings is a vertical section of a resistance device for use in connection with a press and constructed in accordance with one form of the invention.

The stem 11 of the secondary plunger 9 has attached to its lower end, by screws 20, a central upstanding sleeve 21 separated from the shank 11 by an annular space 21$^a$ and having an upper part 22 of reduced diameter which closely fits within and can slide through the central aperture in the bottom 6 of the main cylinder 4, and may also be guided by an upstanding guide sleeve 23 fixed upon the said bottom around the aperture. The top of the upstanding sleeve 22 on the plunger is open, and one or more rectangular slots 24 are provided in its wall, such slots extending below the depending boss 25 on the cover plate 6 when the secondary plunger 9 is fully raised. Disposed within the interior of the slotted sleeve 21, 22, is a closely-fitting rotatable and shouldered sleeve 26 having similar slots 27 and forming a regulating valve for adjusting the effective size of the slots 24 in the outer sleeve 22. By rotating the inner sleeve 26 the slots 27 therein can be made more or less to register with those in the outer sleeve. The inner sleeve 26 is open at the top and is screwed onto the upper cupped end 28 of a sleeve 29 fixed by screw 30 to the upper end of a vertical shank 31 which passes downwards through and is rotatable within a suitable bearing 32 and packing gland 33 in the lower end of the stem 11 of plunger 9, its lower extremity carrying a laterally-extending and cranked operating arm 34 and handle 35, which said arm extends through and is movable within an aperture 36 in the spring casing 15. By operating the arm 34 by the handle 35 the inner sleeve or valve 26 may be turned so as more or less to open the slots 24 in the outer sleeve 22 and thus give the desired initial setting or adjustment as regards the effective size of the slots. The cupped part 28 of sleeve 29 has an aperture 37 in its wall and the sleeve 21 has a large aperture 38 that remains opposite to the aperture 37 throughout the range of adjustment of the sleeve 29. The upper end of the said cupped part 28 forms a seating for a cone valve 39 carried by a stem 40 sliding within the sleeve 29, the lower end of the said stem 40 carrying a stop formed by a screw 41 the head of which works in a chamber 42 vented by means of a passage 43.

The valve 39 is pressed on to its seating by a spring 44 bearing against the shoulder of sleeve 26. During the upward stroke of plunger 9 the fluid above the said plunger is quickly returned to cylinder 4 by passing through the annular space 21$^a$ and apertures 38, 37, thus lifting the valve 39 and passing through sleeves 26 and 22 into the said cylinder 4.

In operation, before the commencement of the downward movement of the pressure or draw ring of the press, the plungers 5 and 9 are at the upper ends of their respective cylinders as shown in Figure 1. As the draw ring moves downward the main plunger 5 is depressed in its cylinder and forces the fluid from the said cylinder through those portions of the slots 24, 27, which are below the boss 23 of the bottom cover plate 6, and thus the fluid enters the lower cylinder 8 above the plunger 9 therein. The fluid acts on the top face of this plunger 9 and forces the latter down against the action of the spring 14. As the said plunger 9 descends the slotted sleeve 22 moves with it within the aperture in the main cylinder bottom and thus the area of the slots which is exposed to the lower cylinder 8 progressively increases, affording a proportionally larger opening for the flow of the fluid into the lower cylinder, and giving a progressively decreasing resistance to the downward movement of the main plunger and of the draw ring. The resistance offered by the compression of the spring 14, however, progressively increases, but by suitable adjustment of the oil slots 24, 27, it can be arranged that the resultant resistance shall be progressively diminishing, which is desirable in connection with drawing presses.

When the pressure upon the draw ring is relieved the secondary plunger 9 is raised by the expansion of the spring 14 and the fluid above is freely returned to the main cylinder 4 through apertures 38, 37, and past the valve 39 and through sleeves 26, 22, as well as through the slots 24, 27, and thus the main plunger is raised.

Figures 2, 3, 4, 5, 7, 8, 9, 10:
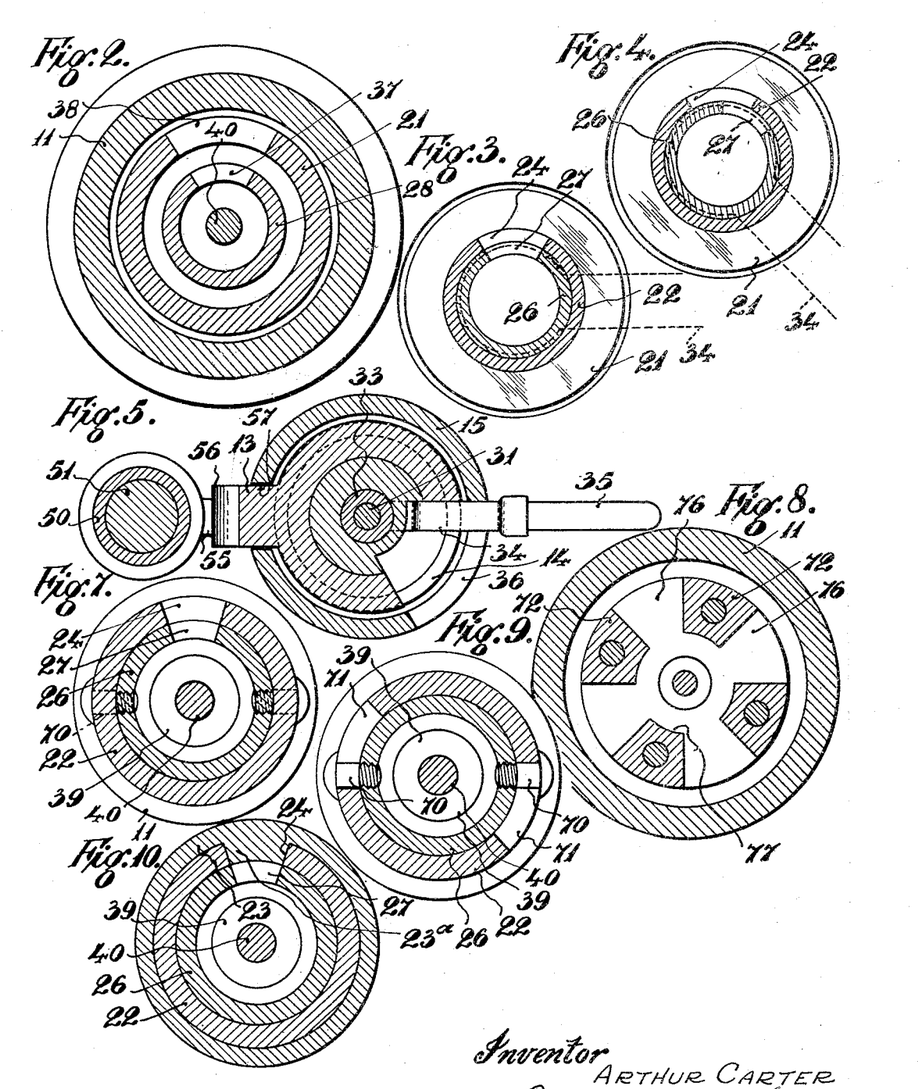
Figure 2 is a cross-section on line 2—2, Figure 1.
Figure 3 is a cross-section on line 3—3, Figure 1, showing the regulating valve in its fully-open position.
Figure 4 is a similar section to Figure 3, but shows the regulating valve partly closed, after adjustment.
Figure 5 is a cross-section on line 5—5, Figure 1.
Figure 7 is a cross-section on line 7—7, Figure 6.
Figure 8 is a cross-section on line 8—8, Figure 6.
Figure 9 is a cross-section on line 9—9, Figure 6.
Figure 10 is a cross section on line 10—10, Figure 6.
Figure 6:
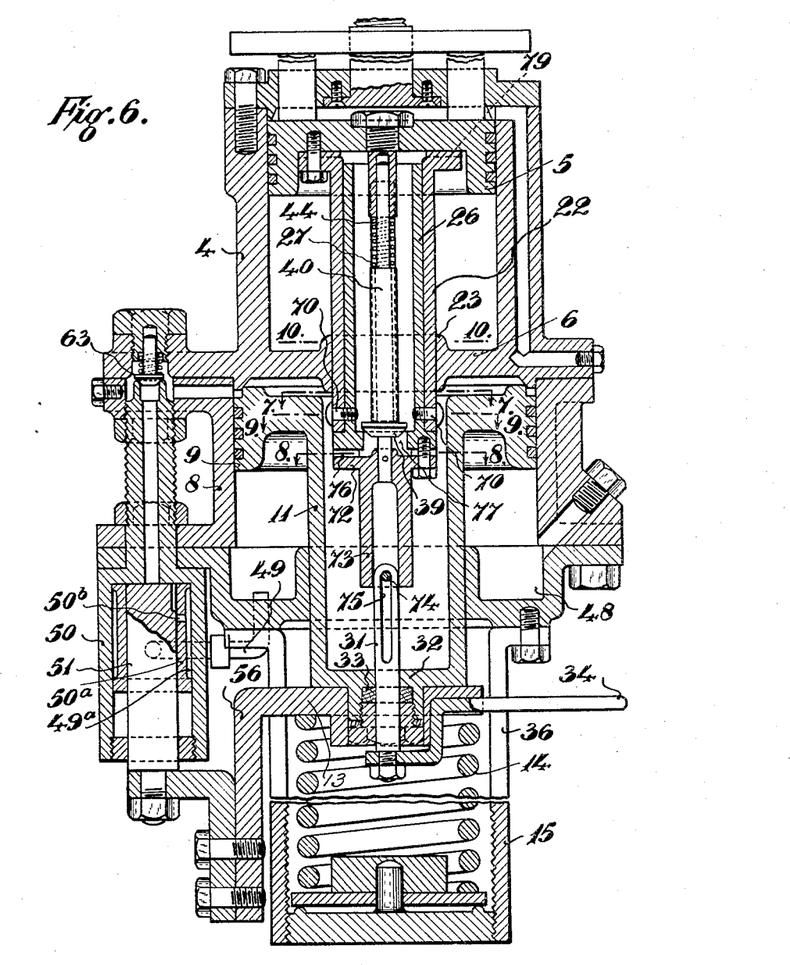
Figure 6 represents a vertical section of a modified form of resistance device for a press.

In order that any fluid that may have escaped past the rings of the plungers may be returned, the space above the main plunger 5 communicates by means of passages 45, 46, 47, in the wall of the main cylinder and in the cover-plate and wall of the secondary cylinder, with a recess or sump 48 in the bottom plate 12 of the secondary cylinder 8, into which sump fluid which has escaped past the secondary plunger may also drain. A certain quantity of fluid is placed in the sump initially through the filling passage 69. From this sump 48 a passage 49 leads to a vertical cylinder 50 in which a plunger pump works, this pump being operated by the secondary plunger 9. The pump comprises a plunger 51 sliding within the cylinder 50 and through a suitable packing 52, in the lower part of the cylinder. The passage 49 enters the cylinder 50 at a point towards the top thereof, and the upper part of the plunger 51 is provided at one side with a recess 53 the lower end of which terminates, when the plunger is fully raised, slightly above the passage 49. The lower end of the pump plunger is connected by a shank 54 and lateral arm 55, to a depending cranked arm 56 carried by one side of the plate 13 carried by the plunger 9, the said arm 56 working in a vertical slot 57 in the casing 15, so that the pump plunger moves with the secondary plunger 9. The upper end of the pump cylinder 50 is extended into a shank 58 which passes through a lower bracket 59 on the side of cylinder 8 and is screwed into an upper bracket 60 also on the said cylinder. The shank 58 is drilled with an axial passage 61 in which slides a tubular stem 62 carrying at its upper end a valve 63 pressed on to a seating at the upper end of the shank 58 by means of a spring 64. The passage of the valve stem 62 is open to the pump cylinder at its lower end, and at its upper end it leads into a transverse passage 65 that opens into an annular space 66 below the valve head. The valve is contained within a chamber 67 leading by a passage 68 into the upper end of the secondary cylinder 8. When the secondary plunger 9 descends the pump plunger 51 moves with it until the recess 53 and top of the plunger uncover the passage 49 and any fluid in the sump 48 can flow into the space above the plunger. When the secondary plunger 9 rises the pump plunger 51 also ascends and after the lower end of the recess 53 has passed the passage 49 the fluid above the plunger is forced through the axial passage of valve stem 62, past the valve 63 and into the secondary cylinder 8 above the plunger therein, and from the said cylinder it can pass into the main cylinder. Should a quantity of fluid in excess of that required be pumped into the secondary cylinder, the secondary plunger 9 will not rise to the top of the cylinder and the recess 53 in the pump plunger 51 will not move above the passage 49, so that any further fluid that flows on to it from the sump will merely be returned through the said passage 49 back to the sump, and no more fluid will be pumped to the secondary chamber until sufficient leakage has occurred to allow of the secondary plunger rising further and the recess 53 of the pump plunger to move past the passage 49 on its upward stroke.

An overflow pipe or outlet may be fitted to the sump so that should the maximum desired level therein be exceeded the excess fluid will flow therethrough and afford an indication that the pump needs attention or that undue leakage is taking place.

If, in certain applications of the invention, it is desired to obtain a constant resistance or a progressively increasing resistance to the force applied, this result may be attained by suitably adjusting the effective size of the slots through which the fluid is discharged from the main cylinder.

In the modification represented in Figures 6 to 10 of the drawings, the device controlling the discharge of the fluid from the main cylinder 4, is carried by the main plunger 5. Thus, the plunger 5 has attached to its underside a depending sleeve 22 which slides through a guide part 23 on the bottom 6 of the cylinder 4 so as to extend into the secondary cylinder 8 and into the hollow stem 11 of the secondary plunger 9. Located within the sleeve 22 is an inner rotatable regulating sleeve 26 supported by pins 70 engaging circumferential slots 71 in the sleeve 22 as shown in Figure 9. The outer sleeve 22 is provided with a long port or slot 24, and the inner sleeve 26 is provided with an exactly similar port or slot 27 adapted to register with the slot 24 or to be turned out of register therewith to vary the effective size of the resultant opening in the two sleeves, the lower ends of both slots 24, 27, extending a short distance into the secondary cylinder 8 when the main plunger is at the top of its stroke. The guide part 23 has a rib 23ª which closely fits the slot 24 so as to isolate the upper and lower parts of said slot (see Figure 10). To enable the inner sleeve 26 to be rotated to vary the effective size of the apertures 24, 27, it has attached to its lower end the flange 72 of a depending hollow shank 73 the interior of which receives a stem 31 which is rotatably mounted within a bearing 32 and packing gland 33 in the lower end of the stem 11 of plunger 9, its lower extremity carrying a laterally-extending operating arm 34 passing through an aperture 36 in the casing 15 containing the spring 14 acting upon the plunger 9 through the medium of the plate 13. A pin 74 across the interior of the shank 73 engages a slot 75 in the stem 31, so that by means of the arm 34 the shank 73 and sleeve 26 may be rotated, but during the descent of the plunger 9 the shank 73 can slide over the stem 31. To allow of a rapid return of the fluid from the cylinder 8 to the main cylinder 4, apertures 76 are provided between the bottom of the sleeve 26 and the flange 72, as shown in Figure 8, the said apertures leading from the cylinder 8 into a chamber 77 below a valve 39 carried by a stem 40, guided as shown, the valve being pressed on to a seating at the top of the chamber 77 by means of a spring 44. When the plunger 9 rises the fluid on its upper side is forced through the passages 76, lifts the valve 39 and passes through the upper part of the slots 24, 27, and also through passages 79 at the top of sleeve 22, into cylinder 4, as well as being forced directly through the lower portions of the slots 24, 37, into sleeves 26 and out into cylinder 4 through the upper parts of the said slots. During the descent of the plunger 5, the fluid is forced through the upper parts of the slots 24, 27, into sleeve 26 and out through the lower portions of the said slots which are situated in the lower cylinder, the effective size of these lower portions of the slots determining the resistance. As the plunger 5 descends the area of the slots which is within the lower cylinder progressively increases and gives a diminishing resistance to the passage of the fluid from the top cylinder to the bottom cylinder. It could, however, be arranged for the discharge aperture to diminish as the main plunger descends such as by making the area of the slot which is initially below the part 23, equal to or larger than the combined areas of the slots above the said part 23 and of the passages 79. The fluid acts on the secondary plunger 9 which is depressed and compresses the spring 14. The plate 13 carries an arm 56 connected to the pump plunger 51, as in the previously-described construction, for pumping collected fluid from the sump 48 past the valve 63 into the upper part of cylinder 8. A pipe 49 may lead from the sump into an annular space 49$^a$ around a bush 50$^a$ in the cylinder 50, the bush having an aperture 50$^b$ co-operating with the pump plunger.

Figures 11, 12, 13:
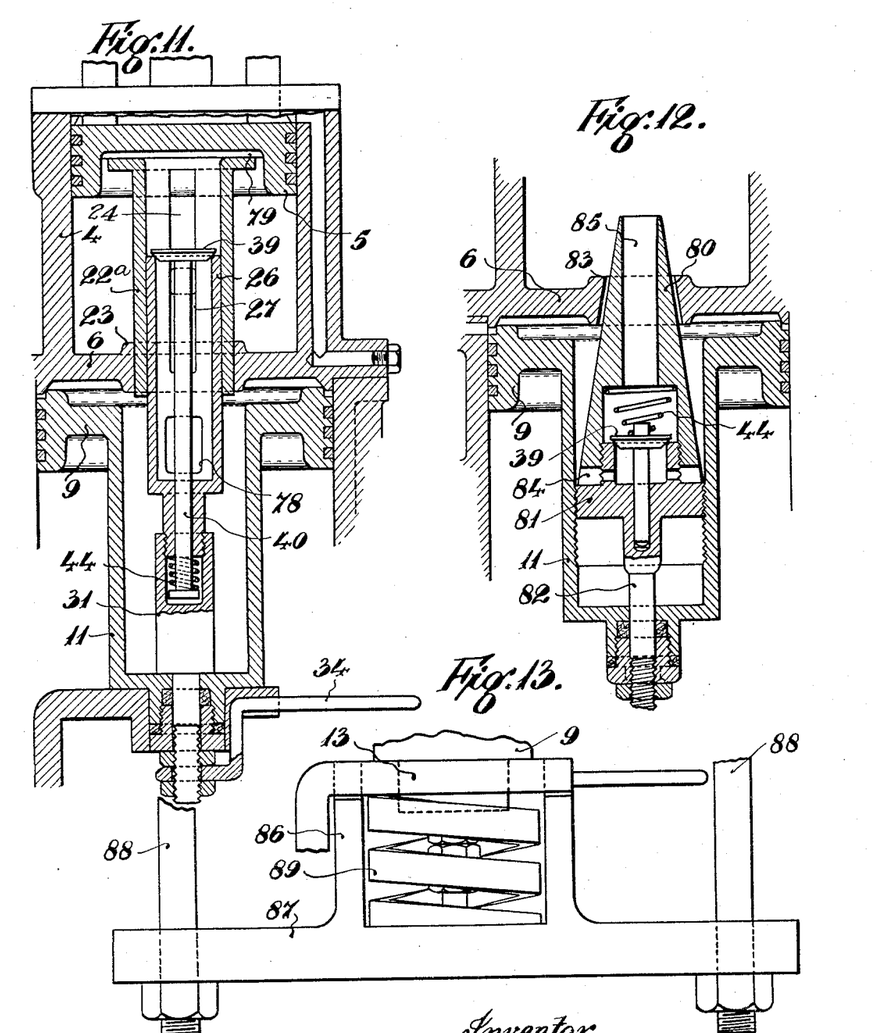
Figure 11 is a vertical section through another modification in which the regulating valve is carried partly by the main piston and partly by the secondary piston.
Figure 12 illustrates another form of regulating valve that may be employed.
Figure 13 illustrates another modification showing how the return stroke may be effected by the ejector rods.

In the arrangement shown in Figure 11, part of the fluid controlling device is carried by the main plunger 5 and part by the secondary plunger 9. Thus, the plunger 5 carries a depending sleeve 22$^a$ sliding through the guide 23 on the bottom 6 of cylinder 4, this sleeve having a slot 24. The hollow stem 11 of the secondary plunger 9 has a shank 31 rotatably mounted in its lower closed end and adapted to be turned by the arm 34. The shank 31 carries the lower end of a sleeve 26 which extends into and closely fits the interior of the sleeve 22$^a$, and has a slot 27 which, when both plungers are raised, overlaps the lower end of the slot 24 as shown. By turning the sleeve 26 by the arm 34 the slot 27 can be moved more or less out of register with the slot 24 to vary the effective resultant area of the aperture formed by the slots. As the main plunger 5 descends fluid is forced through the aperture formed by the overlapping slots and passes into the lower cylinder through a port 78 in the lower part of the sleeve 26. It then acts on the secondary plunger 9 which moves down at a slower rate than the plunger 5 owing to its larger area, and thus the overlapping area of the slots 24, 27, progressively increases, giving a diminishing resistance. The plunger 9 compresses a spring as in the previous arrangements. A valve 39 normally closes the upper end of the inner sleeve 26, so that no fluid can flow through the end of the said sleeve during the down stroke. The valve is maintained on its seating by a spring 44 acting on the stem 40. On the return stroke of plunger 9 the fluid is forced through aperture 78 into sleeve 26 and lifts the valve 39, thence passing into the main cylinder through the upper part of slot 24 and also through passages 79 provided at the top of the sleeve 22$^a$. The area of the discharge passage could be made to diminish as the main plunger descends, such as by having the slot 27 freely open to cylinder 4, (by extending the slot 24 downwards) and controlling a long slot (which may be an extension of slot 27) in the lower part of sleeve 26, by the end of sleeve 22$^a$.

As shown in Figure 12, instead of slotted sleeves being provided for controlling the passage of the fluid from the one cylinder to the other, a cone valve 80 may be employed. This valve 80 is carried by an adjustable base part 81 externally threaded so as to screw into the interior of the hollow stem 11 of the secondary plunger 9, whereby its height may be adjusted. The base 81 is carried by a shank 82 passing through the closed lower end of the stem 11 and connected to suitable means whereby it may be rotated. The cone engages a conical aperture 83 in the bottom plate 6 of the main cylinder and when the two plungers are at the top of their stroke a clearance is provided around the cone to permit of the initial discharge of the fluid from the top cylinder to the lower cylinder when the main plunger descends. This initial clearance can be adjusted by rotating the cone as above described, thereby varying the degree of resistance offered to the passage of the fluid. When the secondary plunger 9 is depressed the cone 80 descends with it and gives a progressively increasing aperture between the two cylinders. The secondary plunger acts upon a spring as in the previously described forms, and the arrangement is such that a progressively diminishing resistance is provided. To enable the fluid to return quickly to the main cylinder when the secondary plunger rises, passages 84 in the base of the cone lead into a chamber below a valve 39 pressed on to its seating by a spring 44, and above the valve is an axial passage 85 through the cone. The valve remains closed during the down stroke of the plungers, but opens on the up stroke to allow the fluid to pass through the passage 85 into the main cylinder. If it is desired to obtain an increasing resistance the cone 80 may be reversed, and carried by the main plunger.

In the case of very heavy presses where a spring would not be effective for returning the draw ring, the lower plunger could be positively raised by the ejector rods of the press. Such an arrangement is shown in Figure 13 where the ring 13, that supports the secondary plunger 9 and operates the pump, is adapted to be positively raised by a cup 86 carried by the ejector plate 87 to which the ejector rods 88 are attached. Preferably, however, the cup 86 contains a spring 89 which acts upon the plate 13 so as to ensure that the secondary plunger shall seat itself upon the conical seating at the top of its cylinder, as shown at 19 in Figure 1, and prevent the escape of fluid past the plunger when the press is standing idle. Or springs could be placed on the ejector rods 88 below the plate 87 for a similar purpose. The resistance to the downward movement of the draw ring would progressively decrease as the discharge aperture from the main cylinder to the secondary cylinder increased.

Figure 14:
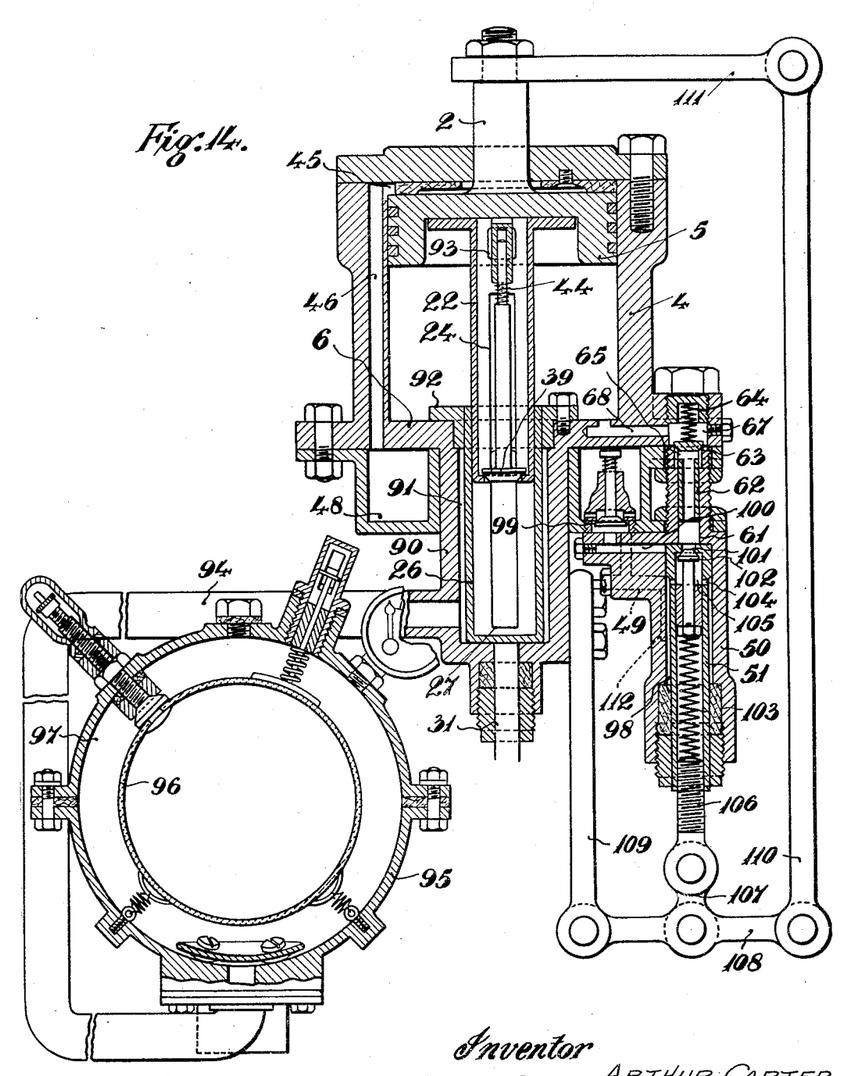
Figure 14 is a sectional view of a further modification in which compressed air is utilized as the elastic medium for resisting the downward movement of the plunger and for effecting the return stroke of the plunger.

Figure 14 shows an arrangement in which air or a gas is employed as the elastic medium for returning the secondary plunger, in lieu of a spring. Thus, the main plunger 5 moving in the cylinder 4 carries a depending sleeve 22 sliding in a sleeve 26 rotatably mounted within a chamber 90 depending from the bottom plate 6 of the cylinder 4 with an annular space 91 between the two parts. The sleeve 22 has a long slot 24 and the sleeve 26 has a similar slot 27, the two slots overlapping to a small extent within the annular space 91 when the plunger 5 is raised, as shown in the drawings. The space 91 is normally isolated from the cylinder 4, other than through the slots, by means of the bush 92 in which the sleeve 26 is mounted. The said sleeve 26 can be rotated, to take the slots 24, 27, more or less out of register, by means of a depending stem 31 passing through the closed lower end of the chamber 90. The lower end of the sleeve 22 is closed, during the down stroke of the plunger, by means of a valve 39 pressed onto a seating by means of a spring 44. An auxiliary port 93 is provided in the upper part of the sleeve. The lower end of the chamber 90 is connected by a conduit 94 to a metal casing 95 enclosing an inflatable elastic or expansible and contractible chamber 96 containing air or other gas, the said chamber 96 being separated from the wall of the casing 95 by an annular space 97. This space 97 and also the conduit 94 and chamber 90, are filled with oil or the like.

During the down stroke of the plunger 5, fluid from the cylinder 4 is forced through slot 24 into sleeve 22 and thence through the overlapping ends of slots 24, 27, into the annular space 91. As the plunger continues to descend the exposed overlap area of the slots 24, 27, forming the discharge aperture for the passage of oil from cylinder 4, progressively increases, thus giving a diminishing resistance to the flow of the oil. The passage of the fluid into the chamber 90 causes an increased pressure upon the elastic chamber 96, thereby compressing the air or the like therein. When downward pressure upon the plunger 5 is relieved, the air pressure within the elastic chamber 96 acts upon the oil or the like so as to force the same through the slot 27, past the valve 39 and through the upper part of slot 24 as well as through the aperture 93 into the cylinder 4, thereby raising the plunger 5. If desired, an increasing resistance to the flow of oil from cylinder 4 may be obtained, such as by placing sleeve 22 in free communication with cylinder 4 and causing said sleeve 22 to close progressively a slot in sleeve 26.

Below the cylinder 4 is an annular sump 48 containing a quantity of oil and into which oil that leaks past the plunger 5 is admitted through passages 45, 46. From the sump 48 a passage 49 leads into the pump cylinder 50 so as to communicate with an annular space 98 around the pump plunger 51 when the latter is raised, and also fitted in the sump 48 is a spring-closed valve 99 controlling the passage of fluid from the sump to a duct 100 leading to the upper end of the pump cylinder. A vertical channel 112 is provided in the wall of cylinder 50, its upper end terminating in passage 49. The pump plunger 51 is hollow and has an aperture 101 in its upper end normally closed by a valve 102 acted on by a spring 103. Apertures 104 are provided between the annular space 98 and a chamber 105 below the valve 102. The plunger 51 is operated by a shank 106 attached to its lower end and connected by a link 107 to the middle point of another link 108 pivoted at one end to a fixed bracket 109 and at its opposite end to a rod 110 depending from an arm 111 carried by the shank 2 of the main plunger 5, so that as the plunger 5 descends the pump plunger is depressed and is raised when the main plunger 5 ascends. Above the pump cylinder is a vertical passage 61 in which slides the tubular stem 62 of a valve 63 pressed onto a seating at the top of the passage 61 by a spring 64. The bore of the stem 62 communicates by lateral passages 65 with a space below the valve 63, and a space 67 above the valve communicates by a passage 68 with the bottom of the cylinder 4.

In operation, when the pump plunger 51 descends, oil is drawn, by suction, from sump 48 past the valve 99 and through the duct 100 into the pump cylinder 50 above the plunger 51, and if the plunger descends sufficiently far oil may also flow from the sump through passage 49 on to the top of the plunger. On the up stroke of the pump plunger, as soon as its upper end has passed the passage 49, the fluid above it is forced through the valve stem 62, lifts the valve 63 and passes through passage 68 into the cylinder 4 in order to replenish the same. If, however, more oil is returned to the cylinder 4 than is needed to compensate for leakage, the pressure exerted by the oil will be increased, owing to the greater compression of the elastic chamber 96, and the valve 63 will remain closed on the up stroke of the pump, whereas the valve 102 will open, so that the fluid above the pump plunger will be forced past the valve 102 and through apertures 104, annular space 98, channel 112 and passage 49 to the sump 48. Thus, no further fluid will be returned to the cylinder 4 until a certain quantity has leaked past the plunger 5 sufficient to reduce the pressure and enable the valve 63 to open on the up stroke of the pump. It will be understood that the strength of the spring 103 is such as normally to hold the valve 102 closed during the up stroke of the pump, but will open when the fluid in the cylinder 4 exerts a certain pressure upon the valve 63.

Having fully described my invention, what I desire to claim and secure by Letters Patent is:—

1. A retarding device comprising a primary cylinder containing a fluid, a plunger therein adapted to be operatively connected to the part whose movement is to be resisted, a secondary chamber or cylinder into which fluid is displaced from the said primary cylinder by the said plunger during the working stroke of the plunger, the said secondary chamber or cylinder communicating with the primary cylinder by means of a passage or aperture through which the said fluid passes, a movable device controlled or regulated by the movement of the plunger in order progressively to vary the effective size of the passage or aperture as the plunger advances, and means within the secondary chamber or cylinder for acting upon the displaced fluid and returning the same into the primary cylinder, and thereby causing the plunger to return to its initial position, when the force applied to the said plunger is relieved.

2. A retarding device comprising a primary cylinder containing a fluid, a plunger therein adapted to be operated by a part whose movement is to be resisted, a secondary chamber or cylinder communicating with the primary cylinder by an aperture or passage through which fluid is adapted to be discharged from the primary cylinder by the plunger therein, means for varying the initial size of the said aperture or passage, a movable device controlled or regulated by the movement of the plunger in order progressively to vary the effective size of the aperture or passage as the plunger advances, and movable means within the secondary chamber or cylinder for acting upon the displaced fluid for returning the same into the primary cylinder, and thereby causing the plunger to return to its initial position, when the force applied to the said plunger is relieved.

3. A retarding device comprising a primary cylinder containing a fluid, a plunger therein adapted to be operated by a part whose movement is to be resisted, a secondary chamber or cylinder, an apertured sleeve movable axially under the influence and control of the movement of the plunger, a part co-operating with the sleeve and in relation to which the sleeve is axially movable so that the aperture of the sleeve in conjunction with the said co-operating part forms a discharge aperture through which fluid displaced from the primary cylinder is passed into the secondary chamber or cylinder during the working stroke of the plunger and which is progressively varied in size as the plunger advances, and movable means within the secondary chamber or cylinder for acting upon the displaced fluid and returning the same into the primary cylinder and thereby causing the plunger to return to its initial position when the force applied to the said plunger is relieved.

4. A retarding device comprising a primary cylinder containing a fluid, a plunger therein adapted to be operated by a part whose movement is to be resisted, a secondary chamber or cylinder, an axially-movable apertured sleeve, means whereby the sleeve is moved axially when the plunger advances, the aperture of the sleeve placing the primary cylinder in communication with the secondary chamber or cylinder and forming a discharge aperture through which fluid displaced from the primary cylinder is caused to pass and which is progressively varied in size as the sleeve and plunger advance, rotatable ported sleeve co-axial with the said apertured sleeve, means for turning the rotatable sleeve relatively to the other sleeve so as to vary the initial effective size of the aperture in said other sleeve, and movable means within the secondary cylinder or chamber for acting upon the displaced fluid and returning the same to the primary cylinder when the force applied to the plunger is relieved.

5. A retarding device comprising a primary cylinder containing a fluid, a plunger therein adapted to be operatively connected to the part whose movement is to be resisted, a secondary chamber or cylinder into which fluid is displaced from the said primary cylinder by the said plunger during the working stroke of the plunger, the said secondary chamber or cylinder communicating with the primary cylinder by means of a discharge passage or aperture through which the said fluid passes on the working stroke of the plunger and also by means of a return passage, a spring-loaded valve normally closing the return passage during the working stroke of the plunger, a movable device controlled or regulated by the movement of the plunger in order progressively to vary the effective size of the discharge passage or aperture as the plunger advances, and means within the secondary chamber or cylinder acting upon the displaced fluid, when the force applied to the plunger is relieved, in order to return the same through the valve-controlled return passage into the primary cylinder.

6. A retarding device comprising a primary cylinder containing a fluid, a plunger therein adapted to be operatively connected to the part whose movement is to be resisted, a secondary chamber or cylinder into which fluid is displaced from the said primary cylinder by the said plunger during its working stroke, the said secondary chamber or cylinder communicating with the primary cylinder by means of a passage or aperture through which the said fluid passes, a movable device controlled or regulated by the movement of the plunger in order progressively to increase the effective size of the passage or aperture as the plunger advances, movable depressible means within the secondary chamber or cylinder against which the displaced fluid acts and an elastic resisting medium acting on the depressible means so as to exert a progressively increasing resistance to the depression of the said movable depressive means and also so as to operate the said means in order to return the displaced fluid into the primary cylinder and raise the plunger.

7. A retarding device comprising a stationary primary cylinder containing a hydraulic fluid, a plunger movable therein, said plunger being adapted to be operated by the part whose movement is to be resisted and also being adapted to act directly upon said hydraulic fluid, a stationary secondary chamber communicating with said primary cylinder by a passage or aperture through which the hydraulic fluid is forced by said plunger, said passage or aperture offering a resistance to the flow of the fluid therethrough, and a movable device in the secondary chamber which is depressed by the fluid displaced by the plunger into said chamber, said movable device being independent of the plunger in the primary cylinder and being operative upon the said fluid which is displaced into the said secondary chamber in order to return the same into the primary cylinder and thereby return the plunger therein when the force applied to the said plunger is relieved.

8. A retarding device comprising a stationary primary cylinder containing a hydraulic fluid, a plunger movable therein and adapted to be operated by the part whose movement is to be resisted, said plunger being adapted to act directly upon said hydraulic fluid, a stationary secondary chamber or cylinder communicating with the primary cylinder by a resistance passage or aperture through which the hydraulic fluid is forced by said plunger, said passage or aperture offering a resistance to the flow of the fluid therethrough, a movable device in the secondary chamber or cylinder which is depressed by the fluid displaced by the plunger into the said chamber or cylinder, said movable device being independent of the plunger in the primary cylinder and being operative upon the said fluid which is displaced into said secondary chamber or cylinder in order to return the same into the primary cylinder when the force applied to the said plunger is relieved, and a spring-loaded valve which is operated by the pressure of the returning fluid so as to open an unrestricted return passage between the primary cylinder and the secondary chamber or cylinder, said passage forming a by-pass to the resistance passage.

9. A retarding device comprising a primary cylinder containing a hydraulic fluid, a primary plunger movable therein and adapted to be operated by the part whose movement is to be resisted, said plunger being adapted to act directly upon said hydraulic fluid, a stationary secondary cylinder communicating with the primary cylinder by a passage offering resistance to the passage of fluid displaced from the primary cylinder by the plunger therein, a plunger in the secondary cylinder which is depressed by the fluid passing into the secondary cylinder, said plunger being independent of the primary plunger, and means for raising the second-mentioned plunger in order to return the fluid from said secondary cylinder to the primary cylinder and thereby cause the primary plunger to be raised when the force applied to said primary plunger is relieved.

10. A retarding device comprising a primary cylinder containing a fluid, a primary plunger therein, a secondary cylinder communicating with the primary cylinder by an aperture, a plunger slidable within the secondary cylinder and adapted to be depressed by the fluid displaced from the primary cylinder by the plunger therein, a regulating member carried by one of the plungers adapted by its movement to vary the effective size of the aperture as the plunger in the primary cylinder advances, and an elastic device in the secondary cylinder which is compressed by the plunger therein when said plunger is depressed by the displaced fluid, said elastic device operating to raise the said plunger and thereby cause the displaced fluid to be returned to the primary cylinder when the force applied to the plunger in said cylinder is relieved.

11. A retarding device comprising a primary cylinder containing a fluid, a plunger therein, a secondary cylinder, a plunger therein, a part separating the primary cylinder from the secondary cylinder and having an opening therein, a sleeve carried by one of the plungers and slidable within the said opening, said sleeve having an aperture through which fluid from the primary cylinder can be forced into the secondary cylinder by the movement of the plunger in said primary cylinder and the effective size of which is progressively varied as the plunger in the primary cylinder advances, and an elastic device in the secondary cylinder which is compressed by the plunger therein when said plunger is depressed by the displaced fluid, said elastic device operating to raise the said plunger and thereby cause the displaced fluid to be returned to the primary cylinder when the force applied to the plunger in said cylinder is relieved.

12. A retarding device comprising a primary cylinder containing a fluid, a plunger therein, a secondary cylinder, a plunger therein, a part separating the two cylinders and having an opening therein, a sleeve carried by one of the plungers and slidable within the said opening said sleeve having an aperture, affording communication between the two cylinders, through which fluid from the primary cylinder can be forced by the movement of the plunger in said cylinder and the effective size of which is progressively varied as the plunger in the primary cylinder advances, a rotary ported inner sleeve within the said sleeve, means for rotating the inner sleeve to vary the initial effective size of the aperture in the outer sleeve, and a spring device in the secondary cylinder which is compressed by the plunger therein when said plunger is depressed by the displaced fluid, said spring device acting to raise the said plunger when the force applied to the plunger in the primary cylinder is relieved.

13. A retarding device comprising a primary cylinder containing a fluid, a plunger therein, a secondary cylinder, a plunger therein, a part separating the two cylinders and having an opening therein, a sleeve carried by one of the plungers and slidable within the said opening, said sleeve having an aperture, affording communication between the two cylinders, through which fluid from the primary cylinder can be forced by the movement of the plunger in said cylinder and the effective size of which is progressively varied as the plunger in the primary cylinder advances, a rotary ported inner sleeve within the said sleeve said inner sleeve having a passage therethrough adapted to allow of the quick return of the displaced fluid from the secondary to the primary cylinder, a spring-loaded valve normally closing said passage during the working stroke of the plunger in the primary cylinder, means for rotating the inner sleeve to vary the initial effective size of the aperture in the outer sleeve, and a spring device in the secondary cylinder below the plunger therein and which is compressed by the said plunger when the latter is depressed by the displaced fluid, said spring device acting to raise the said plunger to return the displaced fluid through the return passage in the inner rotatable sleeve into the primary cylinder.

14. A retarding device comprising a primary cylinder containing a fluid, a plunger therein adapted to be operatively connected to the part to be resisted, a secondary cylinder in communication with the primary cylinder, a plunger therein adapted to be depressed by fluid displaced from the primary cylinder, an elastic device below the plunger in the secondary cylinder adapted to be compressed by the said plunger and to raise the said plunger when force applied to the plunger in the primary cylinder is relieved, a part separating the two cylinders and having an opening therein, an upstanding slotted sleeve on the secondary cylinder plunger slidably fitting the opening so as to extend into and be open to the primary cylinder with its slot partly uncovered within the secondary cylinder to form a fluid discharge aperture which progressively increases in size as the primary cylinder plunger advances.

15. A retarding device comprising a primary cylinder containing a fluid, a plunger therein adapted to be operatively connected to the part to be resisted, a secondary cylinder in communication with the primary cylinder, a plunger therein adapted to be depressed by fluid displaced from the primary cylinder, an elastic device below the plunger in the secondary cylinder adapted to be compressed by the said plunger and to raise the said plunger when force applied to the plunger in the primary cylinder is relieved, a part separating the two cylinders, an opening therein, an upstanding slotted sleeve on the secondary cylinder slidably fitting the opening so as to be open to the primary cylinder with its slot partly uncovered within the secondary cylinder to form a fluid discharge aperture which increases in size as the primary cylinder plunger advances an inner ported sleeve rotatable within the said slotted sleeve, said ported sleeve being mounted on the secondary cylinder plunger, and means for turning the said ported sleeve from the exterior of the device for varying the effective size of the discharge aperture.

16. A retarding device comprising a primary cylinder containing a fluid, a plunger therein adapted to be operatively connected to the part to be resisted, a secondary cylinder in communication with the primary cylinder, a plunger therein, an elastic device in the secondary cylinder adapted to be compressed by the plunger therein and to raise the said plunger when force applied to the plunger in the primary cylinder is relieved, a part separating the two cylinders and having an opening therein, and a depending slotted sleeve carried by the primary cylinder plunger and slidably fitting the opening with the slot partly within the said primary cylinder and partly within the secondary cylinder.

17. A retarding device comprising a primary cylinder containing a fluid, a plunger therein, a secondary cylinder in communication with the primary cylinder, a plunger therein, a spring device in the secondary cylinder adapted to be compressed by the plunger therein and to raise the said plunger when force applied to the plunger in the primary cylinder is relieved, a part separating the two cylinders and having an opening therein, a depending slotted sleeve closed at its lower end, being carried by the primary cylinder plunger and slidably fitting the opening with the slot partly within the said primary cylinder and partly within the secondary cylinder constituting a fluid discharge aperture which varies in effective size as the primary cylinder plunger advances, a rotary ported regulating sleeve fitted within the said slotted sleeve, a rotary member on the secondary cylinder plunger, and slidable coupling means between the said rotary member and the regulating sleeve whereby the latter may be turned to vary the effective size of the discharge aperture.

18. A retarding device comprising a primary cylinder containing a fluid, a secondary cylinder in communication with the primary cylinder, a plunger therein, a spring device in the secondary cylinder adapted to be compressed by the plunger therein and to raise the said plunger when force applied to the plunger in the primary cylinder is relieved, a part separating the two cylinders and having an opening therein, a depending slotted sleeve carried by the primary cylinder plunger and slidable through the said opening, and an upstanding slotted sleeve carried by the secondary cylinder plunger and slidably fitting the depending sleeve, the interior of the said upstanding sleeve communicating with the secondary cylinder and the slots of the two sleeves overlapping to a progressively increasing extent as the primary cylinder plunger advances.

19. A retarding device comprising a primary cylinder containing a fluid, a secondary cylinder in communication with the primary cylinder, a plunger therein, a spring device in the secondary cylinder adapted to be compressed by the plunger therein and to raise the said plunger when force applied to the plunger in the primary cylinder is relieved, a part separating the two cylinders and having an opening therein, a depending slotted sleeve carried by the primary cylinder plunger and slidable through the said opening, an upstanding slotted sleeve rotatably carried by the secondary cylinder plunger and slidably fitting the depending sleeve, the interior of the said upstanding sleeve communicating with the secondary cylinder and the slots of the two sleeves overlapping to a progressively increasing extent in the longitudinal direction as the primary cylinder plunger advances, and external means for rotating the upstanding sleeve to vary the circumferential overlap of the slots of the sleeves and thereby vary the effective size of the fluid discharge aperture.

20. A retarding device comprising a primary cylinder, a plunger therein, a secondary cylinder or chamber in communication with the primary cylinder, an elastically-controlled movable member in the secondary cylinder or chamber which is depressed by fluid forced into the secondary cylinder or chamber from the primary cylinder and acts to return the displaced fluid to the primary cylinder, a sump for receiving fluid that leaks from the space between the plunger and the elastically-controlled member, a pump communicating with said sump and, by a passage with the said space, a spring-loaded valve controlling the said passage, and means for operating the pump to cause the latter to return fluid from the said sump to the said space.

21. A retarding device comprising a primary cylinder, a plunger therein, a secondary cylinder or chamber in communication with the primary cylinder, an elastically-controlled movable member in the secondary cylinder or chamber which is depressed by fluid forced into the secondary cylinder or chamber from the primary cylinder and acts to return the displaced fluid to the primary cylinder, a sump for receiving fluid that leaks from the space between the plunger and the elastically-controlled member, a pump communicating with the sump and with the said space, means for operating the pump, and means whereby the pump, after having returned to the said space an excess of fluid required, operates idly merely to return to the sump the fluid which it receives therefrom until more fluid has leaked from the said space.

In testimony whereof I have affixed my signature.

ARTHUR CARTER.